United States Patent [19]
Altimus

[11] 3,870,875
[45] Mar. 11, 1975

[54] INBOARD OUTBOARD MOTOR COVER

[76] Inventor: William B. Altimus, Box 968, Livingston, Mont. 59047

[22] Filed: Apr. 2, 1973

[21] Appl. No.: 347,047

[52] U.S. Cl. .......................... 240/2 R, 150/52 R
[51] Int. Cl. ...................... F21v 33/00, B65b 11/54
[58] Field of Search .......... 150/52 R; 240/2 R, 2 E; 116/28 R

[56] References Cited
UNITED STATES PATENTS

| | | | |
|---|---|---|---|
| 1,729,274 | 9/1929 | Millar | 116/28 R X |
| 1,752,120 | 3/1930 | Taylor | 240/2 R X |
| 1,820,040 | 8/1931 | Zuckerman | 150/52 R X |
| 2,434,784 | 1/1948 | Bardin | 150/52 R |
| 2,475,135 | 7/1949 | Haven | 150/52 R |
| 3,041,580 | 6/1962 | Boz | 116/28 R X |
| 3,587,508 | 6/1971 | Pearce | 150/52 R X |
| 3,768,503 | 10/1973 | Billington | 150/52 R X |

FOREIGN PATENTS OR APPLICATIONS

| | | | |
|---|---|---|---|
| 102,625 | 7/1963 | Norway | 240/2 R |
| 565,631 | 1/1924 | France | 240/2 R |

*Primary Examiner*—Herbert P. Ross
*Attorney, Agent, or Firm*—Robert E. Kleve

[57] ABSTRACT

This invention comprises a cover for covering the propellor and rear drive assembly of an outboard-inboard motor boat. The cover has an electric taillight mounted to the rear of the cover and which can be electrically connected to the taillight wire of a boat trailer when the boat is mounted on the boat trailer for towing on a roadway, with the light serving as a warning to motorists approaching the boat and boat trailer from the rear.

1 Claim, 5 Drawing Figures

PATENTED MAR 11 1975 3,870,875

INBOARD OUTBOARD MOTOR COVER

This invention relates to covers for boat motors.

It is an object of the invention to provide a novel cover for an inboard-outboard motor of a boat to cover the propellor and adjacent rear drive assembly of the inboard-outboard motor boat, while the boat is mounted on a boat trailer and which cover has an electric taillight built into the cover which can be electrically connected to the taillights of the boat trailer.

It is another object of the invention to provide a novel cover for the propellor and adjacent drive assembly of an inboard-outboard motor boat, which has an electric taillight mounted to the cover to serve as a warning to motorists approaching the boat when mounted on a boat trailer and being towed on a roadway.

It is another object of the invention to provide a novel cover for an inboard-outboard motor to cover the propellor and adjacent drive assembly of an inboard-outboard motor boat and which has visable warning means which can warn a motorist approaching the boat from the rear, while the boat is being towed on a roadway on a boat trailer.

Further objects and advantages of the invention will become apparent as the description proceeds and when taken in conjunction with the accompanying drawing wherein:

FIG. 1 is a side elevational view of the inboard-outboard motor cover illustrating the cover operatively covering the propellor and adjacent rear drive assembly of the motor of the inboard-outboard motor boat, with the fragmentary showing of the boat mounted on a boat trailer, and with an illuminating light mounted on the cover and projecting rearward, and with a drawstring to tighten and fix the cover in position.

Briefly stated, the invention comprises an inboard-outboard motor boat cover for covering the propellor and adjacent rear drive assembly of the motor of an inboard-outboard boat, said cover having an electric taillight mounted thereon at the rear of the cover which projects rearward and which light has an electric cord connection for connecting the light to the taillight wire of a boat trailer when the boat is mounted on a boat trailer for towing along a roadway to provide a warning to motorists approaching the boat and boat trailer from the rear.

Figure 1:
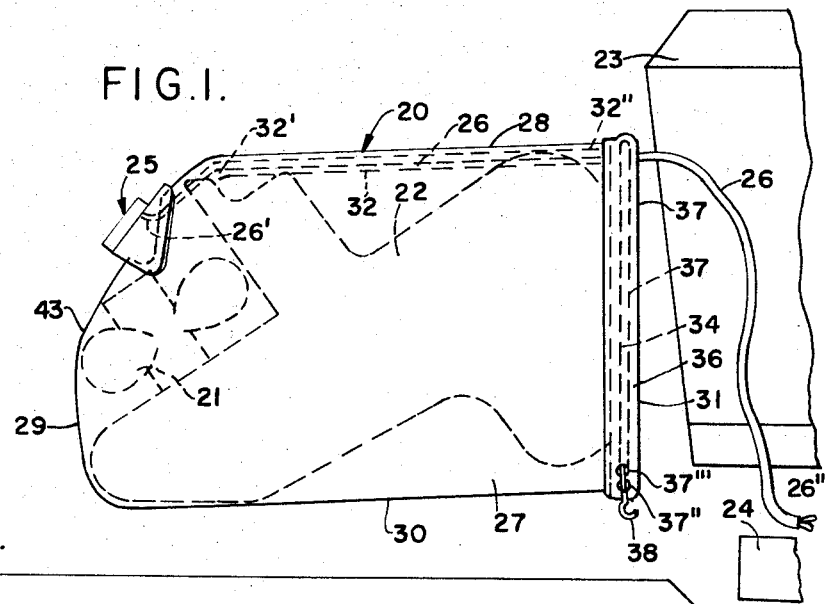

Referring more particularly to the drawing in FIG. 1, the inboard-outboard motor cover 20 is illustrated as operatively mounted over and covering the rear propellor 21 and rear drive assembly 22 of a conventional inboard-outboard motor of a boat 23. The boat 23 is mounted on a conventional boat trailer 24 for towing along roadways. The boat 23 and boat trailer 24 are illustrated in a fragmental showing.

The cover 20 has an electric taillight 25. The electric taillight 25 has an electric bulb (not shown) mounted in the red reflector glass 25'. The electric bulb is electrically connected to an electric cord 26. The cover is made of two identical panels 27 and 27'. The panels 27 and 27' are sewn together along the top edge 28, the rear edge 29, and the bottom edge 30. The panels are free of one another along their front end to form an open end 31.

The cover has fabric flexible sleeve 32 which is mounted to and extends along the top 28 of the cover. One end 32' of the sleeve is adjacent the taillight 25 and the other end 32'' of the sleeve is adjacent the open end 31 of the cover.

Electric Taillight and Cord Connection

The electric cord 26 has one end 26' electrically connected to the bulb in the taillight 25 and has conventional electrical connection clips at its other end 26'' (not shown) to electrically connect the lead electric wires at the outer end 26'' of the cord to the electrical connections to the taillight wires of the boat trailer 24 so that when the boat trailer lights are energized or illuminated, the taillights 25 will be energized or illuminated.

The illuminating light 25 is mounted to a heavy rubber triangular member 33. The triangular member 33 is sewn to the cover 20 along two edges 33' and 33'' as illustrated by the dashed lines 34. The bottom edge 33'''' of the triangular member is spaced rearward and free of the cover. The cover has a hole 35 inside the area of the triangular member, so that air may travel from outside the cover up between the open edge 33''' of the triangular member 33 and the cover and into the hole 35 in the cover, into the interior of the cover to circulate air into the inside of the cover for drying off or evaporating any moisture inside the cover on the propellor or drive assembly, for example.

The electric cord 27 of the electric light 25 extends from the electric light 25 through the hole 35 along the inside of the cover into the one end 32' of the sleeve and along the sleeve 32 and out the other end 32'' of the sleeve and out the open end 31 of the cover, so that the other end of the cord 27 may be electrically connected to the taillight wires of the boat trailer as previously described.

Cover Attachment

The cover will have a reverse fold 36 at its open end. The reverse fold will be sewn to the rear portion of the cover along line 36' to form a channel around the open end 31 of the cover. An elastic rope 37 will extend through the channel. The outer ends 37' and 37'' of the rope extend out through a pair of openings 37''' on the reverse fold of the cover. A pair of hooks 38 and 38' are mounted to the outer ends 37' and 37'' of the rope, so that once the cover is attached or slipped over the propellor and rear drive assembly the hooks may be drawn toward one another and interhooked or hooked together to securely fix the cover 20 to the rear drive assembly.

The elastic cord 37 may slide freely in the channel formed by the reverse fold 36 or possibly may be sewn into the cover at intervals.

The rear face 43 of the cover will be spread out by the propellor when the cover is attached.

Figure 2:
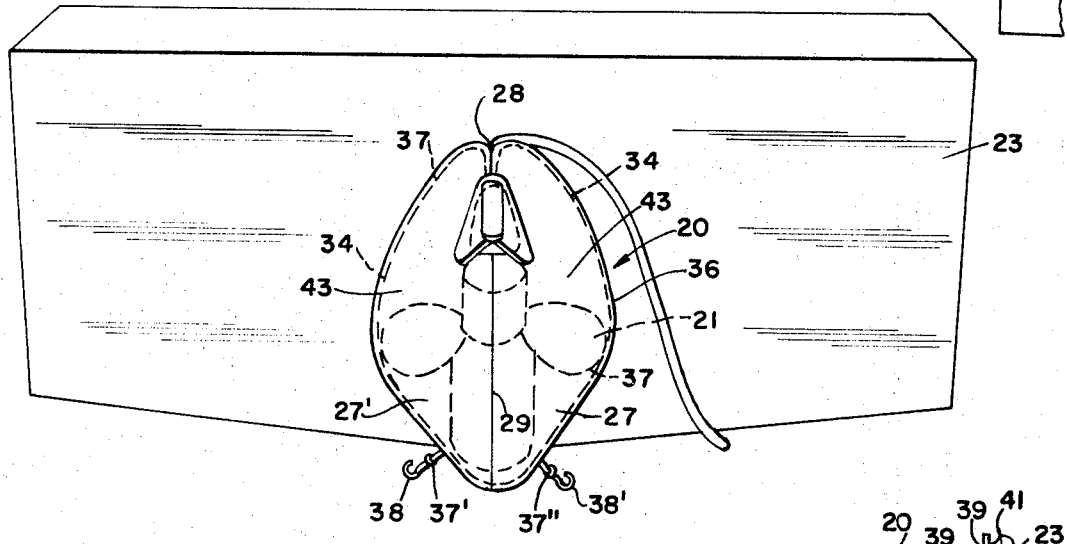
FIG. 2 is a rear elevational view of the inboard-outboard motor cover, covering the propellor and rear drive assembly of the motor of the inboard-outboard motor boat.

FIGS. 1 and 2 illustrate the cover 20 operatively attached and covering the propellor 21 and rear drive assembly 22 of the motor, and illustrate the rope and open end 31 just before the rope has been drawn to tighten the open end 31 about the rear drive assembly.

The cover 20 is normally attached after the boat 23 has been mounted onto the boat trailer 24, and after the propellor and rear drive assembly have been swung upward to their raised position shown in FIGS. 1 and 2, by slipping the open end 31 of the cover forwardly over the propellor and rear drive assembly from left to right when viewed from FIG. 1 to its position shown in FIGS. 1 and 2. Then the open end 31 of the cover will be tightened or contracted about the rear drive assembly by drawing the ends of the elastic cord or rope and hooking the hooks 38 and 38' together, and thereafter electrically connecting the electric cord to the electric taillight wire of the boat trailer.

The cover 20 will be made out of flexible waterproof canvas or other suitable waterproof material. The panels 27 and 27' will be entirely red in color on the outside surface so that it is easy for motorists to see the cover when approaching the boat and boat trailer from the rear.

Also, the rear face 43 of the cover where the two panels 27 and 27' join will be spread out by the propellor 21, when the cover is attached to the propellor and rear drive assembly as illustrated in FIG. 2.

The spreading out of the rear face 43 creates a relatively broad area of red which is viewable directly from the rear of the cover by a motorist approaching the boat and boat trailer.

It is intended that the cover be employed for covering the propellor and rear drive assembly of such inboard-outboard motor boat as the Mercury inboard-outboard motor, for example.

In the Mercury inboard-outboard motor boat as well as most inboard-outboard motor boats, the diameter of the propellor 21 is normally at least 14–16 inches.

As a result, when the cover is attached to the propellor and rear drive assembly, the cover, as viewed from the rear (Figure 2), or in other words, as viewed by a motorist approaching the boat or a boat trailer from the rear, will be spread out by the propellor along its rear face 43. A 14 or 16 inch propellor will spread out the rear face 43 of the red cover more than sufficiently to satisfy most of all the state laws requiring a red flag material of certain area directly viewable from the rear by an approaching motorist approaching from the rear.

Thus, the red spread out area 43 of the red cover eliminates the need for attaching a red flag to the rear of the propellor when towing the boat on a roadway.

Figures 3, 4, 5:
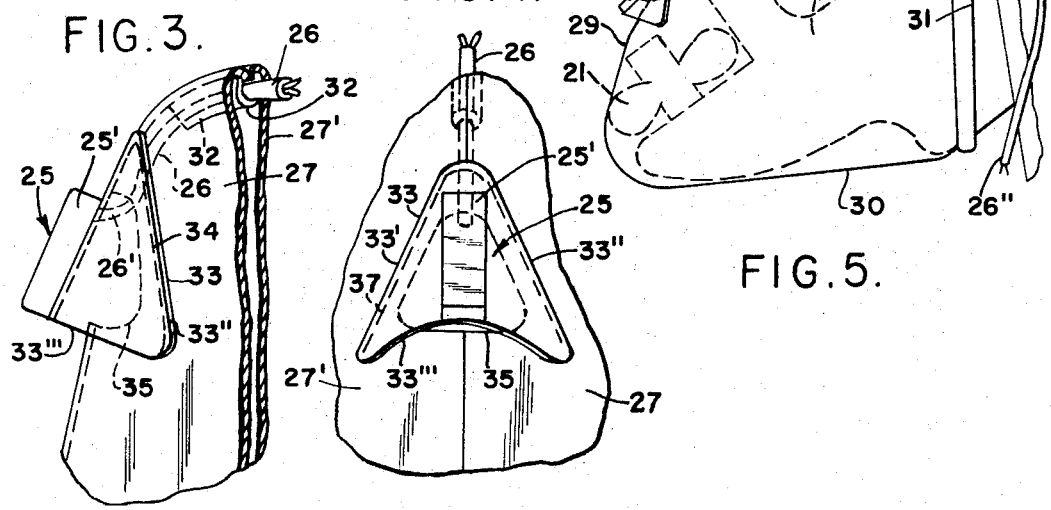
FIG. 3 is an enlarged side elevational view of the illuminating light and port structure of the cover.
FIG. 4 is an enlarged rear elevational view of the illuminating light and port structure of the cover.
FIG. 5 is a side elevational view of a modified form of an inboard-outboard motor cover, covering the propellor and rear drive assembly of the motor of the boat.

In the modified form of inboard-outboard motor cover 20 illustrated in FIG. 5, the construction of the cover is identical to the first form illustrated in FIGS. 1–4, inclusive, except that the open end 31 has no rope 34. Instead a zipper 39 extends along the top 29 of the cover to open and close the top edge 29 of the cover. The zipper extends from location 40 adjacent the rear of the cover to the right front corner 41 of the cover so that when the zipper is unzipped from right to left when viewed from FIG. 5, back to the location 40, the right front corners 41 of the panels 27 and 27' and the top and front edge of the panels 27 and 27' will be free of one another. The cover will be slipped over the propellor and rear drive assembly while the zipper is unzipped to the location 40 until the cover is in its position shown in FIG. 5. Then the zipper will be zipped from left to right back to the right front cover to close the top of the cover and secure the cover to the propellor and rear drive assembly. To remove the cover the zipper will be zipped back to location 40 and the cover is slipped off. The sleeve 32 for holding the cord 26 will be mounted to and along the top edge of the panel 27 beside the zipper.

Thus it will be seen that a novel cover has been provided to serve as a protection cover for the propellor and rear drive assembly of an inboard-outboard motor of a boat, when the boat is mounted on a boat trailer. The cover also serves by its red color and spread out rear area as a red flag to satisfy state requirements for a red cloth flag being placed at the rear of the propellor. Also, the cover by having an electric taillight mounted to the rear of the cover which connects to the taillight of the boat connection provides a visable warning to approaching motorists of the braking action of the boat and boat trailer and towing vehicle by the operator of the towing vehicle.

It will be obvious that various changes and departures may be made to the invention without departing from the spirit thereof, and accordingly it is not intended that the invention be limited to that specifically described in the specification or as illustrated in the drawing but only as set forth in the appended claims wherein:

What is claimed is:

1. A cover in combination with a propellor and adjacent rear drive assembly for an outboard motor boat wherein said propellor and rear drive assembly project from the rear of the boat, said cover comprising an elongated sleeve-like flexible waterproof sheet member permanently closed at one end and open at the other end and adapted to be slipped over said propellor and drive assembly through the open end with the open end being of a diameter so as to fully enclose about the drive assembly, said cover being only of a length to cover and surround the rear drive assembly and the propellor, with the closed end covering and surrounding the propellor, draw string tightening means mounted around the open end of the cover to draw the open end of the cover snuggly about the rear drive assembly as to embrace the assembly in substantially watertight relation, the cover having an opening in said rearward closed end for air to ventilate out of the interior of the cover, a folded panel member permanently attached to the exterior of said cover with its top and side edges secured to the top and side edges of the opening and draping downward therefrom to form a weather shield over said side edges and top edges of said opening to shield the opening and with the bottom edge of the shield permanently bowed out, so that air may pass freely through the opening and from the interior to the exterior of the cover via the bottom edge of the shield, an electric light mounted to the exterior surface of the shield to direct light rearward to serve as a taillight, electric cord means electrically connected at one end to the taillight and extending along the sleeve to the open end for connection to a source of electric current.

* * * * *